United States Patent [19]

Iida

[11] Patent Number: 5,073,818
[45] Date of Patent: Dec. 17, 1991

[54] METHOD FOR PROCESSING COLOR IMAGE AND APPARATUS THEREFOR

[75] Inventor: Tetsuya Iida, Osaka, Japan

[73] Assignee: Minolta Camera Kabushiki Kaisha, Osaka, Japan

[21] Appl. No.: 287,841

[22] Filed: Dec. 21, 1988

[30] Foreign Application Priority Data

Dec. 23, 1987 [JP] Japan .................................. 62-323818
Dec. 23, 1987 [JP] Japan .................................. 62-323819
Dec. 23, 1987 [JP] Japan .................................. 62-323820

[51] Int. Cl.$^5$ ............................................. H04N 1/46
[52] U.S. Cl. ....................................................... 358/80
[58] Field of Search .................. 358/75, 76, 78, 80, 358/401, 448, 447, 452

[56] References Cited

U.S. PATENT DOCUMENTS

| | | | |
|---|---|---|---|
| 4,477,833 | 10/1984 | Clark et al. ............................ | 358/78 |
| 4,598,282 | 7/1986 | Pugsley ................................... | 358/76 |
| 4,668,980 | 5/1987 | Stansfield et al. ..................... | 358/76 |
| 4,731,662 | 3/1988 | Udagawa et al. ...................... | 358/75 |
| 4,758,885 | 7/1988 | Sasaki et al. ........................... | 358/80 |
| 4,866,514 | 9/1989 | Yeomans ................................. | 358/76 |
| 4,893,181 | 1/1990 | Yeomans ................................. | 358/78 |
| 4,928,167 | 5/1990 | Tatsumi et al. ........................ | 358/75 |

FOREIGN PATENT DOCUMENTS 0258740 9/1988 European Pat. Off. .
59-123390 12/1986 Japan .

Primary Examiner—Jin F. Ng
Assistant Examiner—Jerome Grant, II
Attorney, Agent, or Firm—Kenneth L. Sherman

[57] ABSTRACT

A color image processing apparatus for converting original image data in the input system into required copy image data based on a lookup table. The apparatus has a memory for storing corrective functions used for the formation of the lookup table, a command generator for generating a command signal for starting the formation of the lookup table and a table forming system for calling the corrective functions from the memory each time the command signal is generated from the command generator and for forming the lookup table based on the corrective functions. For faithful reproduction of the color image of an original image on a copy image, white points and the achromatic axes of the original image conform with those of the copy image and, at the same time, the ranges of color reproduction of the original image conform with the copy image. The white point, achromatic axis, and range of color reproduction of a color image exhibited as an original image on a color CRT display and those of a color image printed out as a copy image on an image forming device such as an ink jet printer, for example, are allowed to conform with each other.

14 Claims, 8 Drawing Sheets

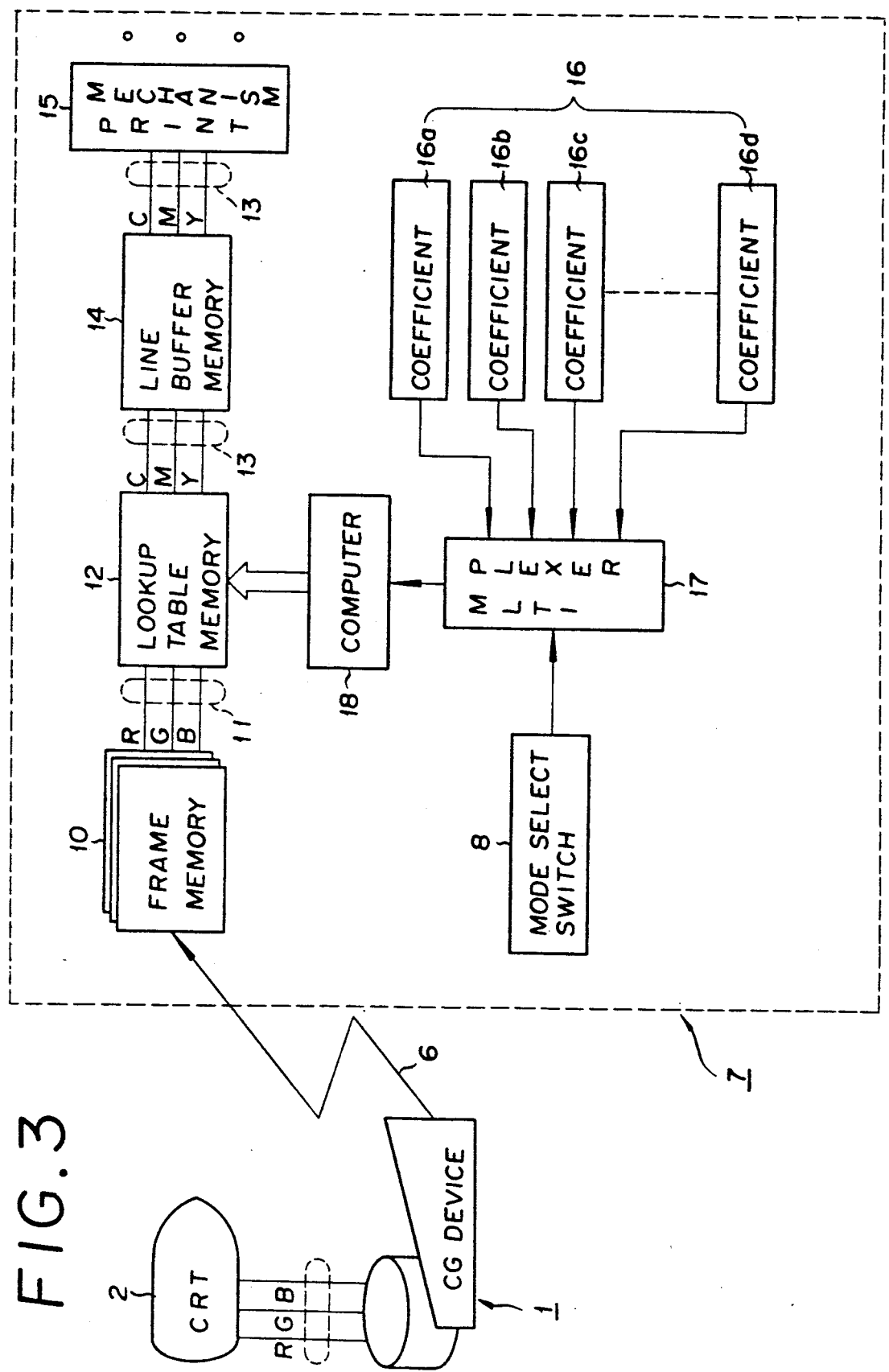

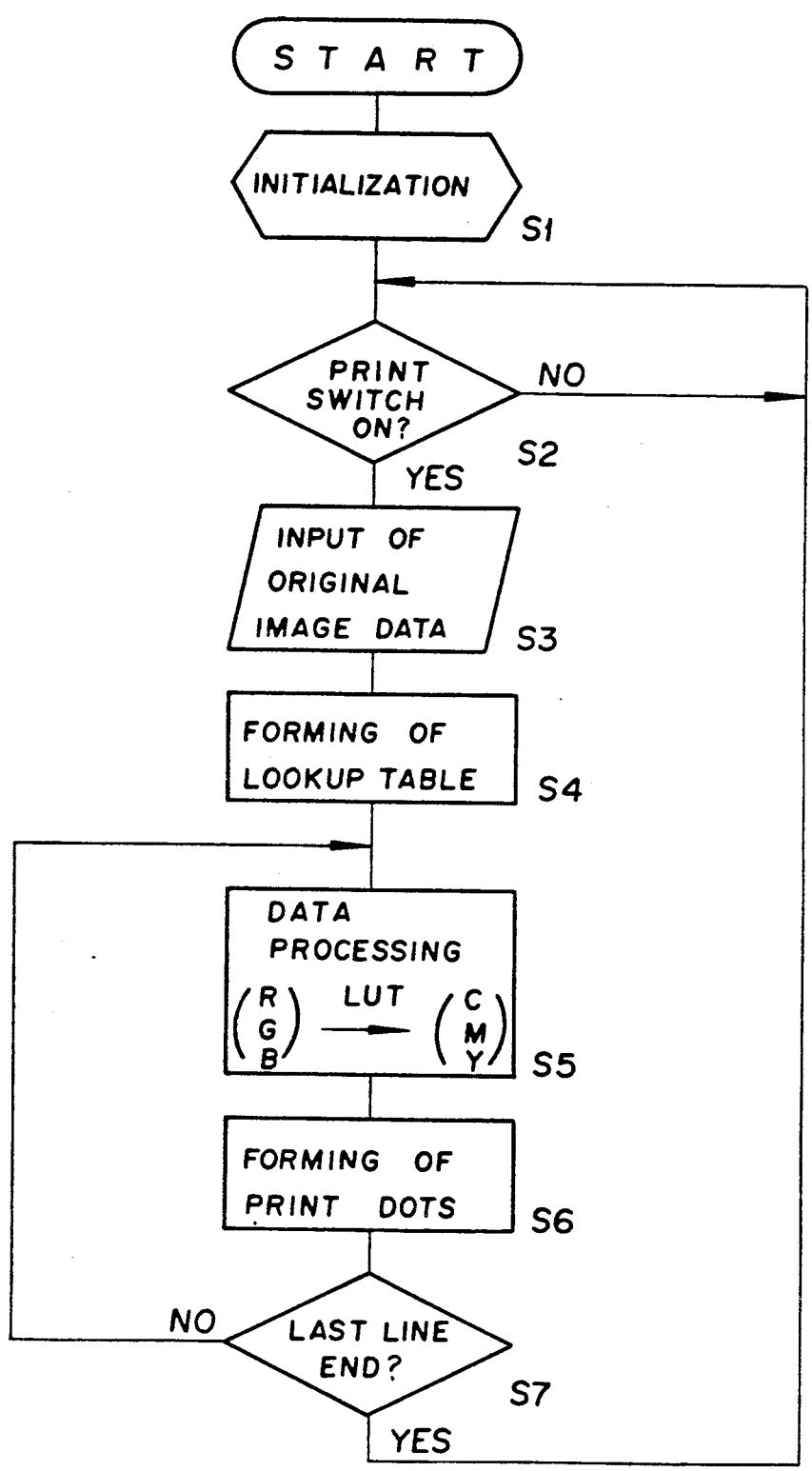

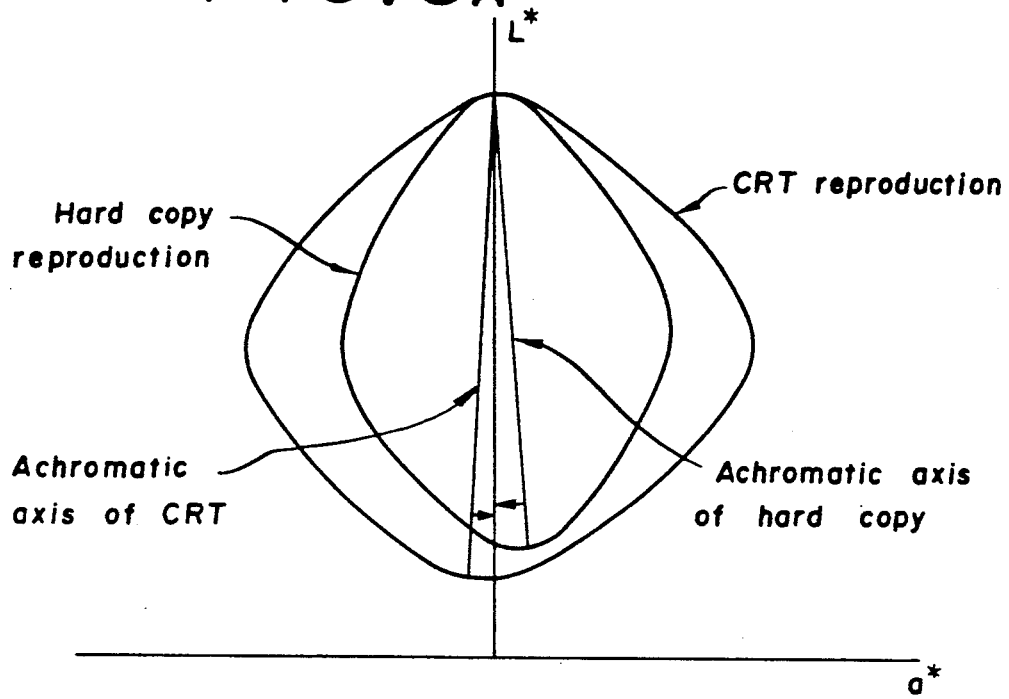
FIG. 6A
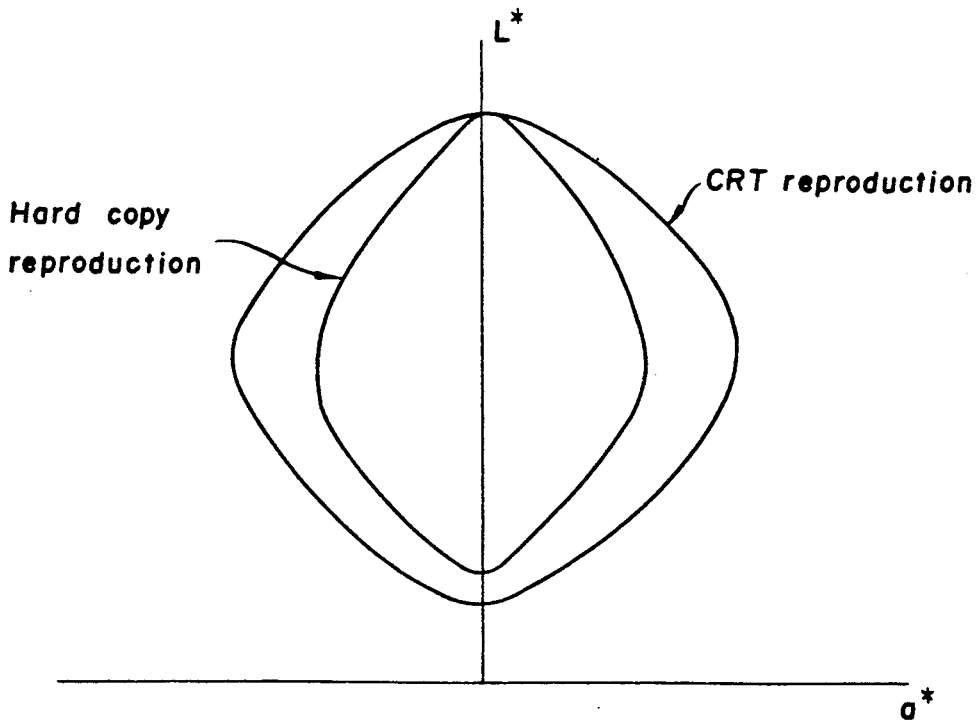
FIG. 6B  Conformation of achromatic axes

METHOD FOR PROCESSING COLOR IMAGE AND APPARATUS THEREFOR

BACKGROUND OF THE INVENTION

1. Field of the Invention

This invention relates to a method for processing a color image and an apparatus therefor, particularly to a method of color image processing for converting color original image data into desired color copy image data and an apparatus therefor.

More particularly, this invention relates to a color image processing method for faithfully reproducing the color image of an input color original image in the form of a color copy image and to a color image processing apparatus for executing the color image processing method by the use of a small memory region.

2. Description of the Prior Art

Recently, color image processing apparatuses for performing the operation of producing color copy images on recording media based on input color original image data have begun to be disseminate in various fields. In the field in which the color image processing apparatuses are utilized as ink jet printers, for example, because of the high excellence in color reproducibility, they find utility mainly in applications specializing in designs of apparel and room interiors, namely the applications which demand faithful color reproduction of original images.

When a color, image given as an original image on a color CRT display and a color image printed out as a copy image by an ink jet printer are compared, they are generally found to lack conformity between the range of reproduction as to color saturation and luminosity of the original image, namely the range of color reproduction, and the range of reproduction of the copy image. For faithful reproduction of the color image of the original image on the reproduced image, therefore, the color image signal being fed into the ink jet printer during the course of the reproduction should be corrected. The technique disclosed in U.S. Pat. No. 4,758,885, for example, effects faithful reproduction of the color image of an original image on a copy image where the range of color reproduction of the color image signal in the input system is wider than that of color reproduction in the output system by causing the input color image to be copied with the range of color reproduction in the input system compressed to that in the output system. This technique, compared with the conventional technique which gives no correction of any sort to the input color image signal, permits reproduction of a copy image rich in gradation.

The image processing apparatus which executes the conventional method of color image signal processing mentioned above is required to carry out the processing of high intricacy at a high speed. As means of expediting this processing, Japanese Patent Application Disclosure SHO 59(1984)-123,390, for example, teaches a technique which comprises preparing a lookup table storing data necessary for the processing, retrieving pertinent data from the lookup table, and enabling the processing to be speedily carried out based on the output data. When this technique relies solely on the provision of this lookup table, the lookup table is inevitably required to possess a very large capacity to a degree to jeopardize the economy of the technique itself. To reduce the volume of data stored in one lookup table, therefore, the technique is compelled to make use of a plurality of such lookup tables. In the performance of hard copying based on an input color image signal, a particular lookup table suitable for the quality of the input color image signal is automatically selected from the plurality of lookup tables and an image of ample legibility is formed based on the contents of the selected lookup table. By this technique, the expediting of the processing and the repression of the rise of cost are both satisfied.

While the conventional image processing apparatuses described above are capable of producing copy images rich in gradation, the copy images they produce have the possibility of portraying a deficiency in naturalism.

This disadvantage is ascribed to the fact that the conventional method of color image signal processing takes due account exclusively of the conformation of the range of color reproduction between the original image and the copy image and pays no consideration to the white point or the achromatic axis.

In accordance with the conventional method of color image signal processing, since it does not take into consideration the conformation of the white point or the achromatic axis, there are times when the gradation is represented while entailing deviation of white level or color hue. When a white color is to be represented, therefore, the white color produced appears with a grayish tint. When a gray color is to be represented, the produced white color appears with a reddish tint or a bluish tint. As a result, the copy image entails the phenomenon of showing a fringe pattern thereon and is possibly deprived conspicuously of naturalism.

An effort to represent an original image in multi-gradation results in a colossal addition to the volume of data to be stored in the lookup table for the correction of multi-gradation images and calls for provision of a large memory region. An effort to store in a memory a multiplicity of lookup tables fit for the status of the input system, for example, necessitates provision of a large memory region.

SUMMARY OF THE INVENTION

This invention aims to provide a method of color image processing free from the various drawbacks suffered by the prior art as described above and an apparatus for working the method. One object of this invention is to provide a method of color image processing for producing a copy image faithfully reproducing the color image of a given original image.

Another object of this invention is to provide a color image processing apparatus which permits the user to store therein the corrective functions to be used for the formation of lookup tables, call out thereof a corrective function pertinent to the occasion, and consult the lookup table formed based on the retrieved corrective function, requires the memory region thereof to permit storage of the formed lookup tables and not to be so large as to store a plurality of lookup tables independent of one another even when a correction is to be given to a multigradation image or when some other lookup table is to be prepared to suit the prevailing status of the input system, for example, and which consequently allows a saving in the memory region.

BRIEF DESCRIPTION OF THE DRAWINGS

FIG. 3 is a diagram illustrating a circuit for the processing of a color image signal between the peripheral devices for a color image processing apparatus as the first embodiment of this invention.

FIG. 4 is a flow chart illustrating the operation of the color image signal processing circuit of FIG. 3.

FIG. 6A and FIG. 6B are explanatory diagrams illustrating the process for effecting conformation of the chromatic axis between the CRT reproduction and the hard copy reproduction region.

DETAILED DESCRIPTION OF THE INVENTION

The present invention will be described in detail below. As a preliminary to the description and for the purpose of facilitating the comprehension of the invention, the essence of the invention will be explained.

Figure 1A:
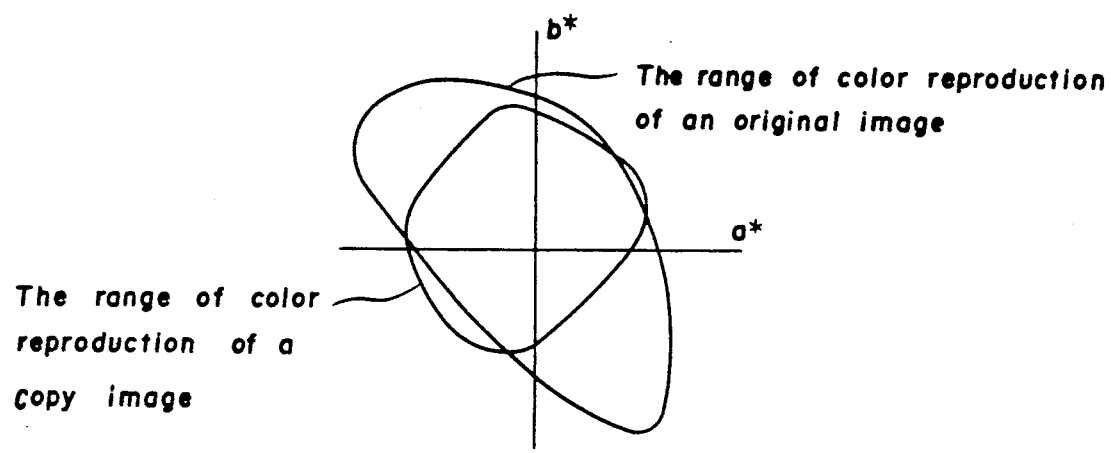
FIG. 1A is a diagram illustrating typically the range of color reproduction of an original image with the CRT display and the range of color reproduction with an ink jet printer, as plotted in the a*-b* coordinates system.
Figure 1B:
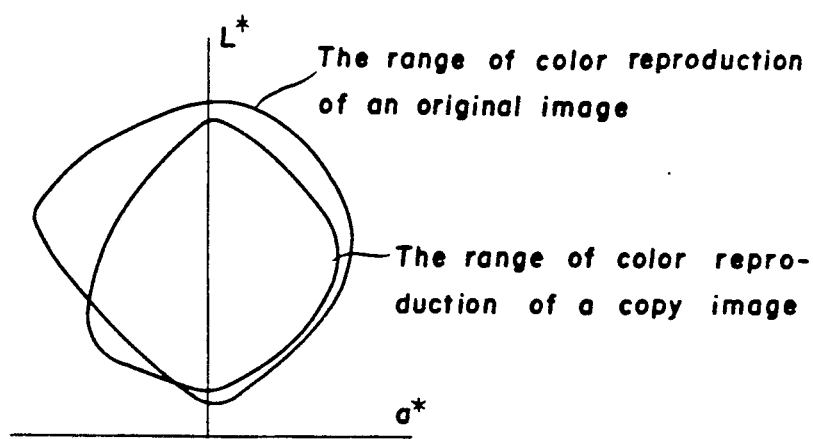
FIG. 1B is a diagram illustrating typically the range of color reproduction of an original image with the CRT display and the range of color reproduction with an ink jet printer, as plotted in the a*-L* coordinates system.

FIG. 1A and FIG. 1B typically illustrate the range of color reproduction of an original image with the CRT display and the range of color reproduction with the ink jet printer, as plotted respectively in the a*-b* coordinates system and the a*-L* coordinates system.

As clearly noted from these diagrams, the range of color reproduction of an original image which can be reproduced by the CRT display is wider than the range of color reproduction of a copy image which can be reproduced by the ink jet printer. For the purpose of faithfully reproducing the color image of an original image on a copy image, the range of color reproduction of the original image must be made to conform with the range of color reproduction of the copy image. The present invention, therefore, contemplates effecting this conformation by fulfilling conformation of the white point and the chromatic axis between the original image and the copy image. Further, the contents to be stored in the lookup table which is required in attaining this conformation are adapted to be formed at a desired time based on the corrective function to be selected, the memory capacity for the lookup table can be reduced to the fullest possible extent. Thus, the present invention aims to permit a saving in the memory region.

A working example of the present invention will be described in detail below with reference to FIG. 2 and the following diagrams. As one example of the image processing apparatus, an ink jet printer which is adapted to print out a copy image based on input image data will be illustrated. It is assumed that this ink jet printer is adapted so that an original image exhibited on the color CRT display, one of the component members of a computer graphic apparatus (hereinafter referred to as "CG device"), is transferred thereto.

Figure 2:
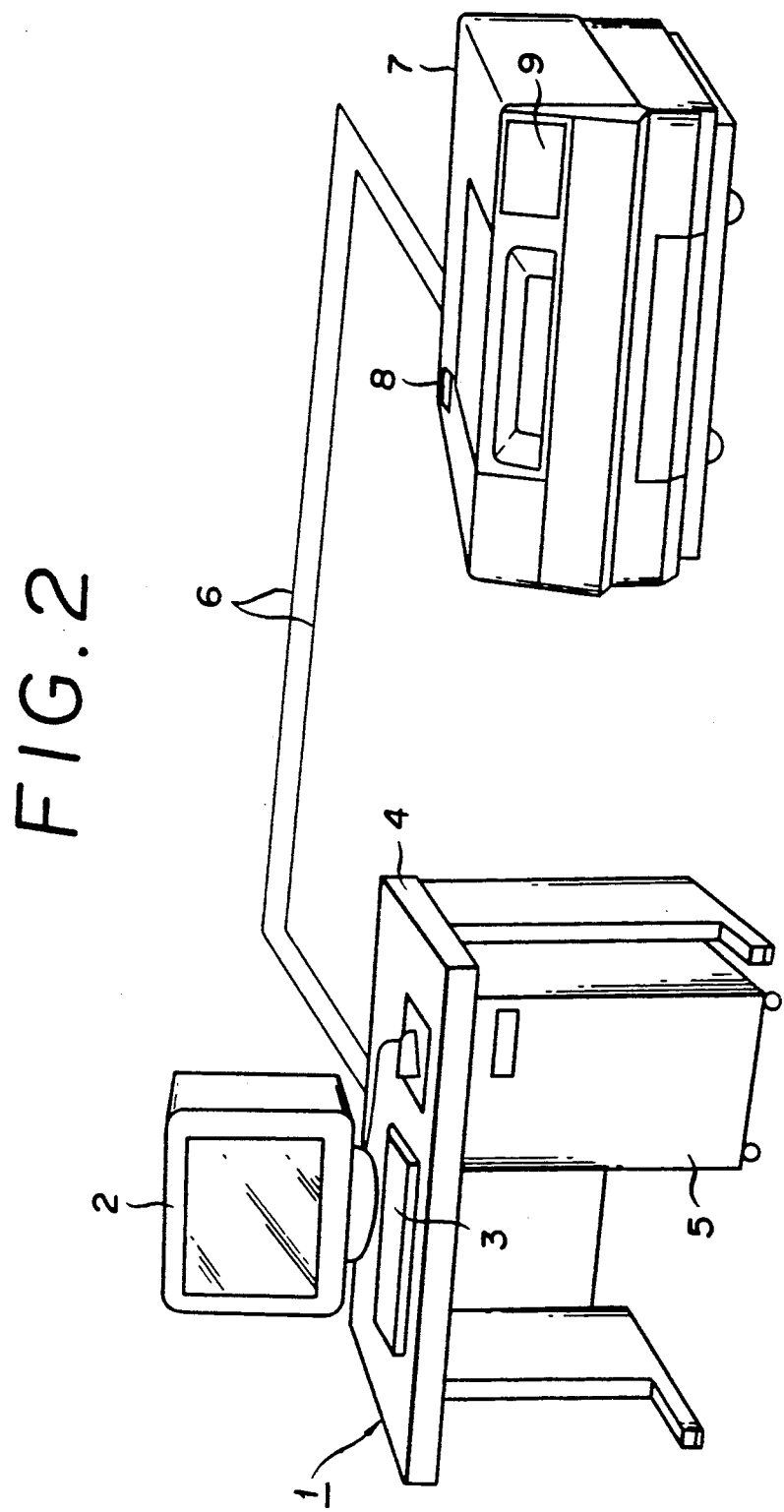
FIG. 2 is a diagram illustrating a typical construction of peripheral devices for an image processing apparatus contemplated by the present invention.

FIG. 2 illustrates the construction of peripheral devices for an image processing apparatus an one embodiment of the present invention.

As illustrated in this diagram, an ink jet printer 7 is connected through the medium of a connecting cable adapted for transfer of image signals and control signals to a CG device 1 which is composed of a color CRT display 2, a keyboard 3, a table 4, a controller 5, etc. This ink jet printer 7 is provided with a mode select switch 8 which forms part of command means to be described later and a print switch 9 (not shown) which is disposed on an operation panel 9 and used in selecting a print start.

The present embodiment will be described below by citing as an original image a color image to be exhibited on the color CRT display, a component member of the CG device. This invention is not required to be limited to this particular color image. Optionally, it is permissible to use as an original image the image to be represented by a RGB signal such as, for example, a color image which is exhibited on the color CRT display, component member of a CAD device.

The present embodiment will be described below by citing as a copy image a color image to be printed out from the ink jet printer. This invention is not required to be limited to this particular copy image. It is, of course, permissible to use as a copy image the image represented by a YMC signal such as, for example, a color image to be printed out by a thermographic or electrostatic printer.

FIG. 3 illustrates a color image signal processing circuit disposed inside the ink jet printer.

As illustrated in the diagram, a frame memory 10 disposed inside the ink jet printer is connected through the medium of a connecting cable 6 and a proper interface (not shown) to the CG device 1. This frame memory 10 is adapted to store therein the RGB signal transmitted from the CG device 1 and intended to exhibit an original image on the color CRT display 2.

The term "RGB signal" as used herein refers to the signal serving to convey each of the three primary colors, red (R), green (G), and blue (B), in the additive color blend. The color CRT display 2 is so adapted as to represent virtually all of the colors by effecting the additive color blend through suitable adjustment of the intensity of each of the red (R), green (G), and blue (B) colors.

A lookup table memory 12 which forms part of table forming means is connected through a RGB bus 11 for the transfer of RGB signals to the frame memory 10. This lookup table memory 12 is adapted so that the lookup table stored therein lends itself to the conversion of the RGB signal adapted for the color CRT display 2 into the YMC signal adapted for the ink jet printer 7. The term "YMC signal" as used herein refers to the signal serving to convey each of the three primary colors, yellow (Y), magenta (M), and cyan (C), in the reductive color blend. The ink jet printer 7 is so adapted as to represent virtually all of the colors by effecting the reductive color blend through suitable adjustment of the intensity of each of the yellow (Y), magenta (M), and cyan (C) colors.

A line buffer memory 14 for storing one line full of color image data represented by the YMC signals is connected to the lookup table memory 12 through the medium of a YMC bus 13 for the transfer of YMC signals which have undergone conversion in the memory 12. A print mechanism 15 serving to form a color image on a recording paper based on color image data fed in through the YMC bus 13 is connected to the line buffer memory 14.

The lookup table memory 12 is connected to a computer 18 having connected thereto a multiplexer 17 which has a mode select switch 8 and a plurality of coefficient series 16 as means for memorizing corrective functions connected thereto and constitutes itself part of command means serving to select one coefficient series from the plurality of coefficient series 16 in accordance with the setting of the mode select switch 8. In this computer 18 is formed a lookup table for the conversion of original image data into copy image data based on the coefficient series selected as described above. The lookup table thus formed in the computer 18 is transferred to the lookup table memory 12 and stored therein. The computer 18 forms part of the table forming means. In the present embodiment, the computer 18 is depicted as connected to the multiplexer 17 having plurality of coefficient series connected thereto. One coefficient series may suffice. In that case, the multiplexer 17 may be omitted.

The operation of the ink jet printer as one embodiment of the present invention will be described below with reference to the flow chart of FIG. 4 depicting the operation.

When a power source switch (not shown) for the ink jet printer 7 is turned on, the control means inside the ink jet printer 7 is initialized (S1) and readied to start. It is assumed that an original image transferred from the CG device 1 is exhibited on the color CRT display 2 and this original image is in a state ready to be transferred, as necessary, to the ink jet printer 7. It is also assumed that the mode select switch 8 is set at a proper position.

When the initialization at S1 is completed, the control device judges whether or not the print switch is set on (S2). This judgment at S2 is repeated until the print switch is turned on. The control device executes a command for the original image data to be issued from the CG device and admitted in the form of a RGB signal into the frame memory 10 via the connecting cable 6 (S3) and stored sequentially at a prescribed address in the frame memory 10. The admission of the original image data in the frame memory 10 may be effected before the print switch is turned on.

In the meantime, the control device executes a command for a particular coefficient series 16 selected by the setting of the mode select switch 8 to be transferred via the multiplexer 17 to the computer 18. Further, the control device reads a pertinent corrective function out of the coefficient series 16 and the original image data out of the frame memory 10 and then executes a command for the computer 18 to form a lookup table addressed to the original image data, based on the corrective function (S4). The lookup table formed in the computer 18 is stored at a prescribed address on the lookup table memory 12. Since a lookup table is formed improvisatorially each time the print switch is turned on, a saving is attained in the memory region which is required where a plurality of lookup tables are to be stored so as to cope with various states.

When the lookup table is admitted in and allocated to the prescribed address in the lookup table memory 12, the apparatus is ready for the conversion of the original image into a copy image.

The method for performing the arithmetic operation on a coefficient series 16a, one of the coefficient series 16 prepared in advance for the purpose of faithfully carrying out the color reproduction of an original image in a copy image, will be described below.

First, the color of the original image exhibited on the color CRT display 2 is represented as (XYZ) CRT by a (XYZ) color system and transferred from the CG device 1 to the color CRT display. When the color represented by the RGB signal is represented as (RGB) CRT by the (RGB) color system, the relation between the two colors is defined by the Formula 1 as widely known. The symbol "f" used in the Formula 1 denotes a proper function representing the characteristic of the color CRT display 2.

When the color of the copy image printed out by the ink jet printer 7 is represented as (XYZ) COPY by the (XYZ) color system and transferred from the frame memory 10 to the lookup table memory 12 and the color represented by the RGB signal is represented as (RGB) COPY by the (RGB) color system, the relation of the two colors is defined by the Formula 2 as well known. The symbol $\phi$ used in the Formula 2 denotes a proper function representing the characteristic of the ink jet printer 7.

For the color reproduction of the original image in the copy image to be faithfully effected as described above, it suffices to equalize the (XYZ) CRT representing the color of the original image with the (XYZ) COPY representing the color of the copy image. Thus, the establishment of the Formula 3 is postulated and the Formula 4 is inferred. The coefficient series 16a, therefore, is obtained when the function $\phi^{-1} \cdot f$ in the Formula 4 is fixed.

$$\begin{vmatrix} X \\ Y \\ Z \end{vmatrix}_{CRT} = f \cdot \begin{vmatrix} R \\ G \\ B \end{vmatrix}_{CRT} \quad \text{(Formula 1)}$$

$$\begin{vmatrix} X \\ Y \\ Z \end{vmatrix}_{COPY} = \phi \cdot \begin{vmatrix} R \\ G \\ B \end{vmatrix}_{COPY} \quad \text{(Formula 2)}$$

$$\begin{vmatrix} X \\ Y \\ Z \end{vmatrix}_{CRT} = \begin{vmatrix} X \\ Y \\ Z \end{vmatrix}_{COPY} \quad \text{(Formula 3)}$$

$$\begin{vmatrix} R \\ G \\ B \end{vmatrix}_{COPY} = \phi^{-1} \cdot f \begin{vmatrix} R \\ G \\ B \end{vmatrix}_{CRT} \quad \text{(Formula 4)}$$

Incidentally, the function $\phi^{-1} \cdot f$ cannot be exclusively determined. This function $\phi$ is, therefore, determined by a procedure which comprises extracting a suitable number, N, of representative colors from the ranges of color reproduction respectively of the original image and the copy image by the use of the (L*a*b*) color system as a uniform perceptive color space, performing on these representative colors an arithmetic operation such as for the conformation of the white color and the conformation of the achromatic axis, and subjecting the representative colors as arithmetically processed to approximation by the least squares method, thereby minimizing the color difference between the original image and the copy image.

The procedure described above will be explored in detail below.

First, the terms L*, a*, and b* are calculated by the Formula 5, i.e. equations for the conversion of the known (XYZ) color system to the (L*a*b*) color system.

$$L^* = 116(Y/Y\cdot)^{\frac{1}{3}} - 16 \quad \text{(Formula 5)}$$

$$a^* = 500[(X/X\cdot)^{\frac{1}{3}} - (Y/Y\cdot)^{\frac{1}{3}}]$$

$$b^* = 200[(Y/Y\cdot)^{\frac{1}{3}} - (Z/Z\cdot)^{\frac{1}{3}}]$$

The symbols X, Y, and Z used in the equations represent three values of stimulus of the standard light source or standard color to be used for the illumination.

Then, a suitable number, N, of the following representative colors corresponding to the ranges of color reproduction of the original image and the copy image are extracted by the use of the (L*a*b*) color system.

$$(Li^*, ai^*, bi^*)CRT \quad \text{(Formula)}$$

$$(Li^*, ai^*, bi^*)COPY$$

Figure 5A:
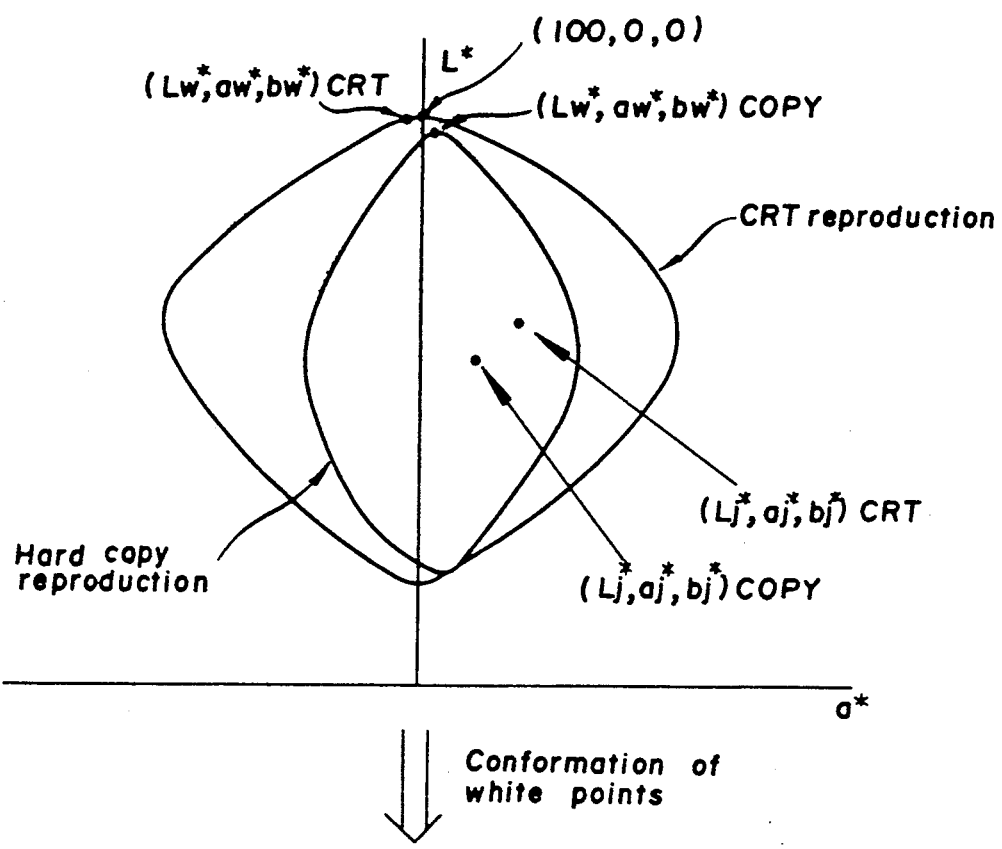
FIG. 5A and FIG. 5B are explanatory diagrams illustrating the process for effecting conformation of the white point between the CRT reproduction and the hard copy reproduction region.

(wherein i=1,2, ... j, .... N). the following description assumes that the (Lj*, aj* bj*) CRT and the (Lj*, aj*, bj*) COPY at the point of sample, i=j, in the N points of sample, fall on a theoretical hypothetic L*-a* plane as illustrated in FIG. 5A.

Figure 5B:
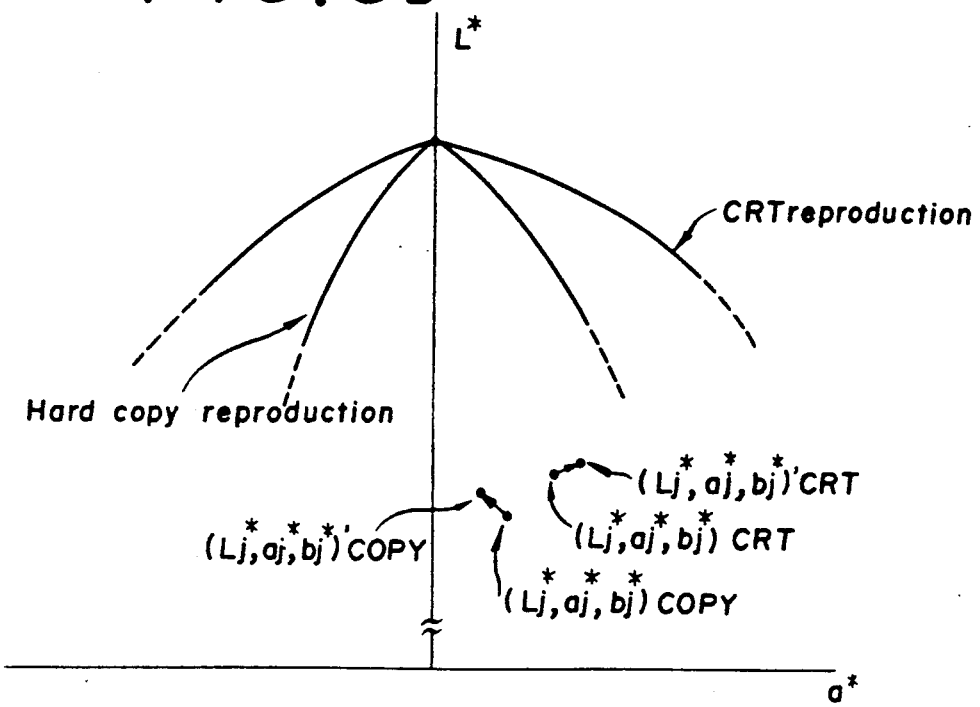

These sample points (Lj*, aj*, bj*) CRT and (Jj*, aj*, bj*) COPY are moved as shown in FIG. 5B and represented by the Formula 6 and Formula 7, after the processing for the conformation of the white points existing in the ranges of color reproduction of the original image and the copy image.

$$(Lj^*, aj^*, bj^*)'CRT = \{(100, 0, 0) - (Lw^*, aw^*, bw^*)CRT\} + (Lj^*, aj^*, bj^*)CRT \quad \text{(Formula 6)}$$

In this formula, (Jj*, aj*, bj*)' CRT represents the point assumed by the point (Lj*, aj*, bj*) CRT after the movement, (100,0,0) the hypothetic white point in the theoretical hypothetic L*-a* plane, and (Lw*, aw*, bw*) CRT the white point in the range of color reproduction of the original image.

$$(Lj^*, aj^*, bj^*)' COPY = \{(100, 0, 0) - (Lw^*, aw^*, bw^*) COPY\} + (Lj^*, aj^*, bj^*) COPY \quad \text{(Formula 7)}$$

In this formula, (Lw*, aw*, bw*) COPY represents the white point in the range of color reproduction of the copy image.

The sample points mentioned above are moved to permit conformation of the white points of the original image and the copy image by subtracting the white points present in the ranges of reproduction of the original image and the copy image from the theoretical hypothetic white points and then adding the sample points, (Lj*, aj*, bj*) CRT or (Lj*, aj*, bj*) COPY, to the resultant differences. This movement is executed on all of the N sample points in the (Lj*, aj*, bj*) CRT and the (Lj*, aj*, bj*) COPY.

When the processing for the conformation of white points by the arithmetic operation mentioned above is completed, the processing is started for the conformation of the achromatic axis and the theoretical hypothetical achromatic axis L* in the ranges of color reproduction of the original image and the copy image. In this case, the amounts of movement, (lj, mj, nj)' CRT or (lj, mj, nj)' COPY, which are required for the conformation of the achromatic axes with the hypothetic achromatic axes L* at the sample points (Lj*, aj*, bj*)' CRT and (Lj*, aj*, bj*) COPY which were moved during the conformation of the white points, among other sample points subjected to the movement are calculated by the use of a function reversely proportional to the distances d from the sample points mentioned above to the achromatic axes so as to increase the amounts of movement of the sample points in the proximity of the achromatic axes.

$$(lj, mj, nj)' CRT = (1 - d\ CRT/d'\ CRT)(lj, mj, nj)\ CRT \quad \text{(Formula 8)}$$

In this formula, d CRT represents the shortest distance from the sample point to the achromatic axis, (lj, mj, nj) CRT the distance from the achromatic axis to the hypothetical achromatic axis L*, and d' CRT the constant fixed in advance. This constant, d' CRT, has an amply larger value than the aforementioned distance, d CRT.

$$(lj, mj, nj)' COPY = (1 - d\ COPY)(lj, mj, nj)\ COPY \quad \text{(Formula 9)}$$

In this formula, d COPY, (lj, mj, nj) COPY, and d' COPY have the same meanings as defined above.

Figure 7:
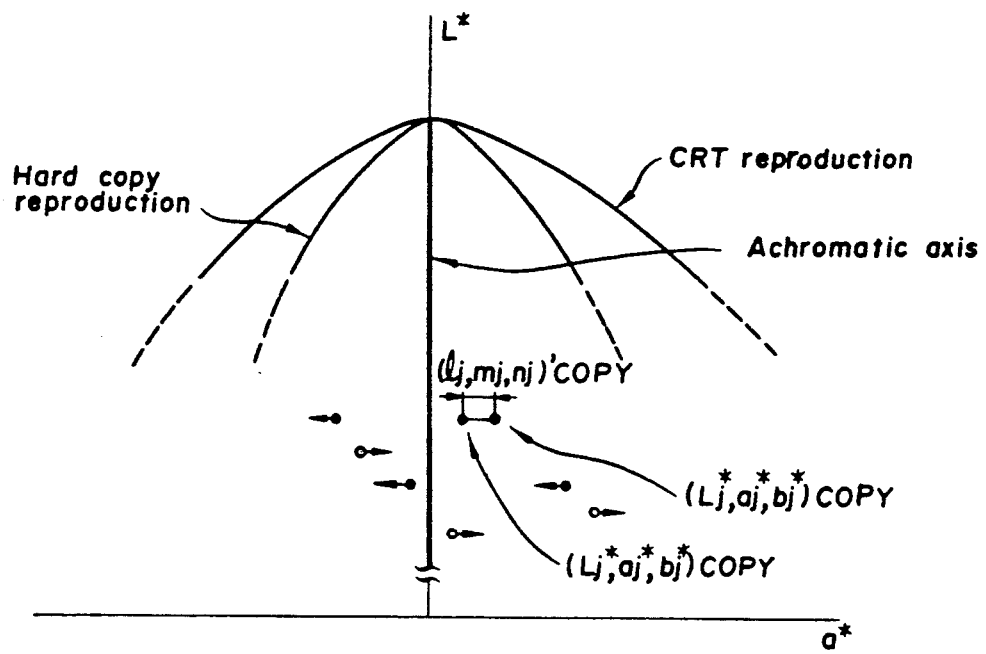
FIG. 7 is an explanatory diagram illustrating calculation of the points of movement to be produced on conformation of the white point and chromatic axis between the CRT reproduction and the hard copy reproduction region.

The points of movement (Lj*, aj*, bj*) to be assumed after the conformation of the white points and the achromatic axes are then calculated based on the aforementioned calculated points (Lj*, aj*, bj*) and amounts of movement (lj, mj, nj)', as shown by FIG. 7 and represented by the Formula 10 and Formula 11.

$$(Lj^*, aj^*, bj^*)''\ CRT = (Lj^*, aj^*, bj^*)'\ CRT + (lj, mj, nj)'\ CRT \quad \text{(Formula 10)}$$

$$(Lj^*, aj^*, bj^*)''\ COPY = (Lj^*, aj^*, bj^*)'\ COPY + (lj, mj, nj)'\ COPY \quad \text{(Formula 11)}$$

In the present embodiment, d is treated as substantially equalling the distance from the achromatic axis to the base of a perpendicular of a given sample point subjected to movement drawn across the achromatic axis to the hypothetical achromatic axis. In actuality, this variable d represents the distance between the sample point mentioned above and the achromatic axis in a circle to be described with the white point as the center and the distance from the white point to the sample point as the radius. In the present embodiment, the aforementioned approximate value is taken for d because the simplification of the arithmetic operation is important and the variable d is not required to be exact. This rule also applies to (lj, mj, nj).

Figure 8:
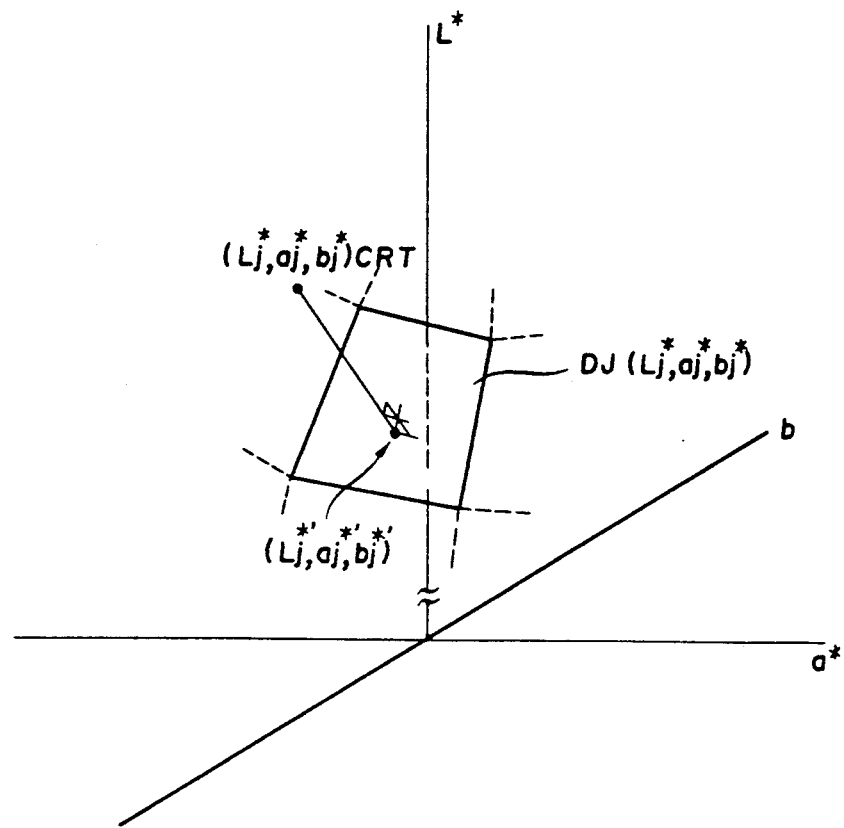
FIG. 8 is an explanatory diagram illustrating the process for causing transfer of the color existing inside the range of color reproduction in an original image and outside the range of color reproduction in a copy image to the surface in the range of color reproduction of the copy image.

Finally, after the white points and the achromatic axes have been conformed as described above, the processing is executed for moving to the surface of the range of color reproduction of the copy image those of the colors existing within the range of color reproduction of the original image which fall outside the range of color reproduction of the copy image as illustrated in FIG. 8.

By approximating the range of color reproduction in the copy image with a polyhedron of 300 plane faces, for example, representing one of the plane faces as $D_J$ (Lj*, aj*, bj*), and representing the color points existing outside the range of color reproduction of the copy image and inside the range of color reproduction of the original image as (Lj*, aj*, bj*) CRT, the $D_J$ is defined by the Formula 12 using the constants A, B, C, and D.

$$ALj^* + Baj^* + Cbj^* + D = 0 \qquad \text{(Formula 12)}$$

The coordinates (Lj*', aj*', bj*') of the bases of perpendiculars passing the sample points (Lj*, aj*, bj*) CRT and terminating on $D_J$ are represented by the Formula 15, based on the Formula 13.

$$Lj^{*'} = Lj^* - \frac{A(ALj^* + Baj^* + Cbj^* + D)}{A^2 + B^2 + C^2} \qquad \text{(Formula 13)}$$

$$aj^{*'} = aj^* - \frac{B(ALj^* + Baj^* + Cbj^* + D)}{A^2 + B^2 + C^2} \qquad \text{(Formula 14)}$$

$$bj^{*'} = bj^* - \frac{C(ALj^* + Baj^* + Cbj^* + D)}{A^2 + B^2 + C^2} \qquad \text{(Formula 15)}$$

The final points of movement (Lj*, aj*, bj*)'', therefore, equal the aforementioned (Lj*, aj*, bj*)'' with respect to the sample points existing within the range of color reproduction of the copy image. In the case of the colors existing within the range of color reproduction in the original image, the final points of movement (Lj*, aj*, bj*)''' with respect to the sample points of the colors existing outside the range of color reproduction in the copy image equal (Lj*', aj*'bj*').

Now that the final points of movement (Lj*, aj*, bj*)''' have been calculated, the function, $\phi^{-1}.f$, which minimizes the color difference between the original image and the copy image is found by subjecting these final points of movement (Lj*, aj*, bj*)''' to the approximation by the least squares method. By forming a lookup table based on the function, $\phi^{-1}.f$, obtained as described above, namely the coefficient series 16a, and effecting the correction of the original image with reference to the lookup table, the range of color reproduction in the copy image is conformed with the range of color reproduction in the original image. Since the conformation has also been attained with respect to the white points and the achromatic axes, the copy image faithfully reproducing the color image of the original image as aimed at by the coefficient series 16a can be obtained.

When the formation of the lookup table at S4 is completed, the control device executes the processing of conversion comprising the steps of sequentially reading original image data from the frame memory 10 via the RGB bus 11 and, with the aid of the data of the lookup table addressed to the original image data formed in advance at S4, faithfully reproducing the color image of the original image on the copy image (S5). In consequence of the processing of conversion performed at S5, the original image data introduced in the form of RGB signals are converted into the copy image data in the form of YMC signals.

Further, the control device executes a command for causing one line full of image data out of the copy image data obtained by the conversion at S5 to be sequentially stored at a prescribed address in the line buffer memory 14 via the YMC bus 13. When the storage of the one line full of image data in the line buffer memory 14 is completed, the control device executes a command to read image data sequentially from the line buffer memory 14 and then a command to transfer the image data to the print mechanism 15 via the YMC bus 13. The control device then executes a command to drive the print mechanism 15 based on the injected image data. Consequently, the print mechanism 15 prints out the one line full of image data to form print dots (S6).

After completion of the processing at S6, the control device judges whether the image data of the last line have been printed out or not (S7). When the judgment draws an affirmative answer, the processing is returned to S2 and left standing there until the print switch is turned on again. If the judgment draws a negative answer, the processing is returned to S5 and allowed to repeat the subsequent steps.

The present embodiment has been described as using as an output system the setup for storing coefficient series within the ink jet printer. The output system is not required to be limited to this particular setup. Optionally, the desired correction of image may be effected instead by causing a coefficient series capable of producing a desired copy image to be transferred to the table forming means from a host computer connected through a suitable interface.

In the present embodiment, by allowing a lookup table for correcting input image data to suit the prevalent state of affairs to be improvisatorially formed and enabling the formed lookup table to be used for consultation, the processing for conversion of original image data into copy image data possessing a desired color image corrected to suit the state of affairs mentioned above is accomplished. When a multi-gradation image is to be corrected, for example, or even when some other lookup table is to be prepared to suit the convenience of the input system, since the lookup table is formed improvisatorially each time a new state of affairs arises, the memory region is only required to be enough to store the formed lookup table and is not required to be so large as to permit storage of a plurality of such lookup tables. Thus, the present invention permits a saving in the memory region.

Figure 9:
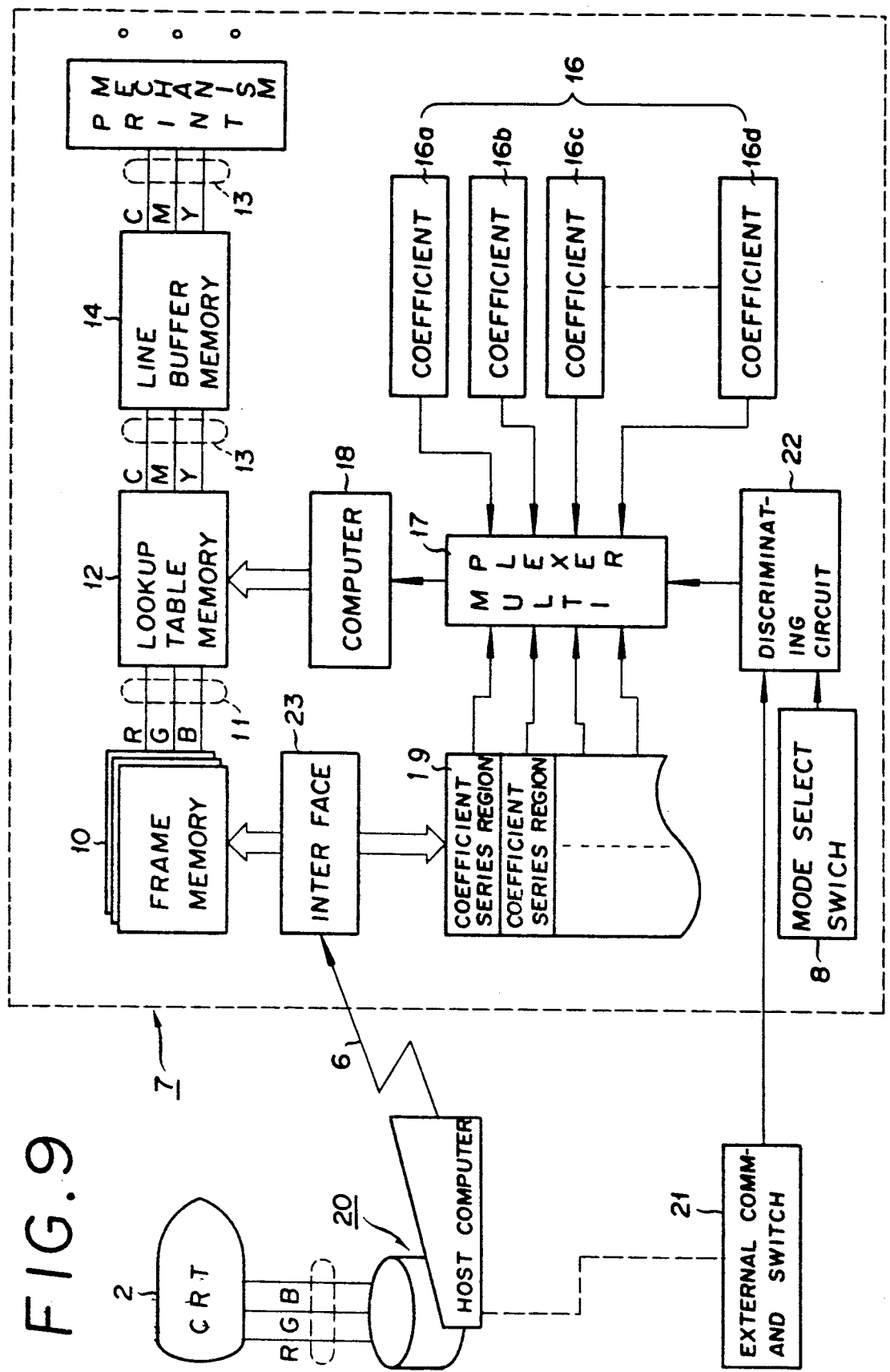
FIG. 9 is a diagram illustrating a color image signal processing circuit disposed between the peripheral devices of the color image processing apparatus as the second embodiment of this invention.

FIG. 9 illustrates a second typical construction of the peripheral devices for the image processing apparatus of the present invention.

This embodiment constructs the peripheral devices of the image processing apparatus by using a host computer provided with external command switches in place of the CG device and having connected to the multiplex a circuit for discriminating between the operations of an external command switch and a mode select switch.

As illustrated in the diagram, the frame memory 10 disposed inside the ink jet printer 7 is connected via the connecting cable 6 and the interface 23 to the host computer 20. This frame memory 10 is adapted to store therein the RGB signal transferred from the host computer 1 and intended to exhibit an original image on the color CRT display 2. The host computer 20, the connecting cable 6, and the interface 23 forms a function transfer means. The term "RGB signal" as used herein refers to a signal for conveying each of the three primary colors, red (R), green (G), and blue (B), in the additive color blend. The color CRT display 2 is so adapted as to permit representation of virtually all of the colors by suitably adjusting each of the colors, red (R), green (G), and blue (B), to a suitable intensity by the additive color blend.

The lookup table memory 12 which forms part of the table forming means is connected to the frame memory 10 through the RGB bus serving to transfer the RGB signals so as to enable the RGB signals adapted for the color CRT display 2 to be converted into the YMC signals adapted for the ink jet printer 7 through reference to the lookup table stored in the frame memory 10.

The line buffer memory 14 for storing therein one line full of color image data represented by YMC signals is connected to the lookup table memory 12 via the YMC bus 13 serving to transfer the YMC signals which have undergone the conversion in the lookup table memory 12. To the line buffer memory 14, the print mechanism 15 for forming a color image on the recording paper in accordance with the introduced color image data is connected via the YMC bus 13.

The computer 18 which forms part of the table forming means is connected to the lookup table memory 12. The plurality of coefficient series 16 which have corrective functions for the correction of an original image, stored in advance therein and form part of the function storing means, are connected to the computer 18. Further, the multiplexer 17 having connected thereto a coefficient series region 19 which is connected to the host computer 20 via the aforementioned connecting cable 6 and interface 23, used for storing the corrective functions transferred from the host computer, and adapted to form part of the function storing means capable of memorizing a plurality of corrective functions is also connected to the computer 18. To this multiplexer 17 is connected a discriminating circuit 22 which has connected to itself a mode select switch 8 for selecting one coefficient series from the plurality of coefficient series 16 and an external command switch 21 for selecting one corrective function from the coefficient series region 19 storing therein a plurality of corrective functions. The outcome of selection between the mode select switch 8 and the external command switch 21 is transferred to the multiplexer 17. The multiplexer 17, the mode select switch 8, the external command switch 21, and the discriminating circuit 22 jointly form command means.

In the computer 18 connected to the multiplexer 17 which has connected to itself the coefficient series 16, the coefficient series region 19, and the discriminating circuit 22, a lookup table for the conversion of the original image data into the copy image data in accordance with the coefficient series selected in accordance with the outcome of selection transferred from the discriminating circuit 22 is formed improvisatorially. The lookup table thus formed in the computer 18 is transferred to and stored in the lookup table memory 12.

Where the mode select switch 8 has not selected any of the coefficient series 16 and the external command switch 21 has selected a suitable corrective function from the coefficient series region 19, the lookup table is formed in accordance with the selected corrective function. Where the mode select switch 8 has selected a suitable coefficient series 16 and the external command switch 21 has not selected any of the corrective function from the coefficient series region 19, or where the coefficient series region 19 has not memorized any corrective function at all, the lookup table is formed in accordance with a suitable coefficient series which is selected from the coefficient series 16 based on the outcome of the selection made by the mode select switch 8. In short, the lookup table is formed in accordance with either coefficient series suitably selected by the mode select switch 8 or the corrective function selected from the coefficient series region by the external command switch 21.

After the lookup table is formed as described above, the image processing apparatus of this embodiment operates to form the copy image in entirely the same manner as described in the first embodiment.

In addition to the effects derived from the first embodiment, the present embodiment brings about an effect of permitting instantaneous formation of a lookup table as required by transferring from the image transfer means to the image storing means a corrective function fit for varying the state of affairs of the copy image data involved. Due to this effect, the apparatus of this embodiment enables the formation of a copy image of a desired color image to be realized promptly by a simple operation and enjoys outstanding practical utility.

The present embodiment has been described as having a mode select switch and an external command switch connected to a discriminating circuit. This invention is not required to be limited to this particular arrangement. The external command switch may be adapted to combine the function of a mode select switch with the function inherent therein and then connected to the discriminating circuit instead.

The first and second embodiments have been described with reference to several arrangements for allowing corrective functions to be transferred to and stored in the coefficient series region for the purpose of obtaining a copy image faithfully reproducing the color image of the original image. Otherwise, special corrective functions severally adapted for varying conveniences on the part of the input system such as, for example, a first corrective function exclusively used for the first CRT display, a second corrective function for the second CRT display, a third corrective function for the CG image, and a fourth corrective function for the human image may be transferred and stored instead. Alternatively, special corrective functions calculated to copy for varying states of the output system, depending on the types of ink used in the ink jet printer or the types of recording medium may be transferred and stored.

Where the faithful reproduction does not dictate very strict adherence, corrective functions intended to stress contrast of an original image, emphasize the peripheral part of an original image, or similarly modify an original image may be transferred as required. This arrangement can be easily realized by the analysis of the color characteristics of the original image and the copy image.

What is claimed is:

1. A color image processing apparatus for converting original image data from an input system into required copy image data for copy system based on a look-up table addressed to said original image data, comprising:
    function storing means for storing a corrective function to be used during the formation of said look-up table;
    function transfer means for transferring a corrective function to said function storing means;
    said function storing means comprising a first region for a corrective function having stored in advance therein and a second region for a corrective function to be transferred from said function transfer means;

command means for generating a command signal for starting the formation of said look-up table, including a select switch, a command switch, a multiplexer, and a discriminating circuit, the selection of the corrective function from said first region being effected by said select switch and the selection of the corrective function from said second region being effected by said command switch, the discriminating circuit discriminating the states of operation of said select switch and said command switch, and transferring to said multiplexing selecting the corrective function from said first or second region in accordance with the outcome of selection; and table forming means for calling said corrective functions from said function storing means each time said command signal is generated from said command means, and for forming said look-up table based on said corrective functions.

2. A color image processing apparatus according to claim 1, wherein said first region is capable of storing a plurality of corrective functions.

3. A color image processing apparatus according to claim 1, wherein said second region is capable of storing a plurality of corrective functions.

4. A color image processing apparatus according to claim 1, wherein said function transfer means includes a host computer.

5. A color image processing apparatus for converting original image data from an input system into required copy image data for a copy system based on a lookup table addressed to said original image data, which apparatus comprises:

function storing means for storing corrective function to be used during the formation of said look-up table;

function transfer means for transferring said corrective functions to said function storing means, command means for generating a command signal for starting the formation of said lookup table, including a select switch, a command switch, a multiplexer, and a discriminating circuit, the selection of corrective functions from a coefficient series being effected by said select switch and the selection of corrective functions from a coefficient series region being effected by said command switch, the discriminating circuit discriminating the states of operation of said select switch and said command switch, and transferring to said multiplexer the outcome of selection made by either said select switch or said command switch, and said multiplexer selecting corrective functions from said coefficient series or said coefficient series region in accordance with the outcome of selection, and table forming means for calling said corrective functions from said function storing means each time said command signal is generating from said command means, and for forming said lookup table based on said corrective functions.

6. A method of converting first image data which is used in an input device into second image data which is used in an output device in a color image processing apparatus, said first image data corresponds to a first color coordinate system of the input device and represents first colors to be reproduced by the input device, while said second image data corresponds to a second color coordinate system of the output device and represents second colors to be reproduced by the output device, the method comprising:

a first step of providing a plurality of the first colors which exist in a predetermined color coordinate system;

a second step of providing a plurality of second colors which exist in said predetermined color coordinate system;

a third step of executing a coordinates transformation so that the white point and the achromatic axis of said first color coordinate system are conformed with the white point and the achromatic axis of said predetermined color coordinate system;

a fourth step of executing a coordinates transformation so that the white point and the achromatic axis of said second color coordinate system are conformed with the white point and the achromatic axis of said predetermined color coordinate system;

a fifth step of executing a coordinates transformation so that the first colors existing outside a color reproduction range of said second color coordinate system is approximated to the nearest colors within said color reproduction range, after said first to fourth steps, and a sixth step of calculating a function for converting the first image data representing the first colors into the second image data representing the second colors, each of which exists in the vicinity of the corresponding first color in said predetermined color coordinate system, after said fifth step.

7. The method of claim 6 wherein the calculating function for converting includes an approximation by a least squares method.

8. A method of converting first image data which is used in an input device into second image data which is used in an output device in a color image processing apparatus, said first image data corresponds to a first color coordinate system of the input device, while said second image data corresponds to a second color coordinate system of the output device, the method comprising:

a first step of converting the first color coordinate system, including a plurality of first sampled colors, into a predetermined color coordinate system;

a second step of converting the second color coordinate system, including a plurality of second sampled colors, into said predetermined color coordinate system;

a third step of executing a coordinates transformation so that the white point and the achromatic axis of said converted first color coordinate system are conformed with the white point and the achromatic axis of said predetermined color coordinate system, and providing coordinates of the first sampled colors after execution of the coordinates transformation;

a fourth step of executing a coordinates transformation so that the white point and the achromatic axis of said converted second color coordinate system are conformed with the white point and the achromatic axis of said predetermined color coordinate system, and providing coordinates of the second sampled colors after execution of the coordinates transformation;

a fifth step of executing a coordinates transformation so that the first sampled colors existing outside a color reproduction range of said second color coordinate system obtained in said fourth step is approximated to the nearest color within said color reproduction range, and a sixth step of calculating a function for converting the first image data representing the first sampled colors into the second image data representing the second sampled colors, each of which exists in the vicinity of the corresponding first sampled color in said predetermined color coordinate system.

9. An image processing apparatus for converting original color image data input from an input system into desired color image data capable of reproducing a color image by an output system, the apparatus comprising:

storing means for storing a plurality of coefficient series;

interface means for receiving an external coefficient series transferred from an external apparatus and for storing the received coefficient series;

selecting means for selecting a desired coefficient series from either said plurality of coefficient series stored in said storage means or said external coefficient series stored in said interface means;

table forming means for improvisatorially forming a lookup table based on said desired coefficient series selected by said selecting means, and converting means for converting the original color image data into the desired color image data based on said lookup table improvisatorially formed by said table forming means.

10. An image processing apparatus as claimed in claim 9, said selecting means selecting a desired coefficient series from said plurality of coefficient series stored in said storing means in response to a command transferred from an external apparatus.

11. An image processing apparatus for converting original color image data input from an input system into desired color image data capable of reproducing a color image by an output system, the apparatus comprising:

first storing means for storing coefficient series in advance;

second storing means for receiving and storing a second coefficient series fit for varying the input image data, the second coefficient transferred from an external apparatus;

selecting means for selecting a desired coefficient series from said coefficient series stored in either said first or said second storing means;

table forming means for improvisatorially forming a look-up table based on said desired coefficient series selected by said selecting means, and converting means for converting the original color image data into the desired color image data based on said look-up table formed by said table forming means.

12. An image processing apparatus as claimed in claim 11, in which each of said first and second storing means stores a plurality of coefficient series.

13. An image processing apparatus as claimed in claim 12, said selecting means including means for designating a desired coefficient series from said plurality of coefficient series stored in said first storing means and means for receiving a command transferred from an external apparatus to designate a desired coefficient series from said plurality of coefficient series stored in said second storing means.

14. A color image processing apparatus according to claim 1, wherein said table forming means includes a computer and a memory.

* * * * *